US008697164B2

(12) United States Patent
Foley et al.

(10) Patent No.: US 8,697,164 B2
(45) Date of Patent: Apr. 15, 2014

(54) COMMERCIAL LETTUCE PACKAGING IN THE FIELD (75) Inventors: Terence J. Foley, Salinas, CA (US); Guillermo M. Jimenez, Yuma, AZ (US)

(73) Assignee: Dole Fresh Vegetables, Inc., Westlake Village, CA (US)

(*) Notice: Subject to any disclaimer, the term of this patent is extended or adjusted under 35 U.S.C. 154(b) by 174 days.

(21) Appl. No.: 13/089,176

(22) Filed: Apr. 18, 2011

(65) Prior Publication Data
US 2012/0263843 A1 Oct. 18, 2012

(51) Int. Cl.
*A23L 3/10* (2006.01)

(52) U.S. Cl.
USPC ........ 426/411; 426/410; 47/58.1 FV; 383/43; 383/71; 229/87.08

(58) Field of Classification Search
USPC ......... 229/87.08; 383/43, 71, 33; 47/58.1 FV, 47/24.1, 901; 426/411
See application file for complete search history.

(56) References Cited

U.S. PATENT DOCUMENTS

| 2,585,214 | A | * | 2/1952 | Belmont ................. 383/43 |
| 3,958,751 | A | | 5/1976 | Bruno |
| 4,061,785 | A | | 12/1977 | Nishino et al. |
| 4,075,785 | A | | 2/1978 | Jones |
| 4,442,740 | A | | 4/1984 | Rayton |
| 4,876,146 | A | | 10/1989 | Isaka et al. |
| 4,956,209 | A | | 9/1990 | Isaka et al. |
| 5,046,302 | A | | 9/1991 | Bolejack et al. |
| 5,111,639 | A | | 5/1992 | Bolejack et al. |
| 5,112,674 | A | | 5/1992 | German et al. |
| 5,130,152 | A | | 7/1992 | Alameda |
| 5,160,768 | A | | 11/1992 | Antoon, Jr. |
| 5,352,108 | A | | 10/1994 | Kagawa et al. |
| 5,443,851 | A | | 8/1995 | Christie et al. |
| 5,451,257 | A | | 9/1995 | Kagawa et al. |
| 5,484,654 | A | | 1/1996 | Mueller |
| 5,491,019 | A | | 2/1996 | Kuo |
| 5,523,136 | A | | 6/1996 | Fischer et al. |
| 5,638,660 | A | | 6/1997 | Kuo |
| 5,666,784 | A | | 9/1997 | Weder |

(Continued)

FOREIGN PATENT DOCUMENTS

| EP | 0383575 A2 | 8/1990 |
| EP | 0180468 B1 | 3/1991 |

(Continued)

OTHER PUBLICATIONS

Commercial Vegetable Production Guides, Lettuce, Oregon State University, [on line] Aug. 6, 2004, retrieved Apr. 18, 2013. Retrieved from the Internet: URL: <http://nwrec.hort.oregonstate.edu/lettuce.html>.*

(Continued)

*Primary Examiner* — Rena Dye
*Assistant Examiner* — Chaim Smith
(74) *Attorney, Agent, or Firm* — Morrison & Foerster LLP (57) ABSTRACT

Lettuce can be commercially packaged in the field using a wrap that has a body with an opening, and an elastomeric portion around the opening. The elastomeric portion of the wrap is stretched wide enough to place the head into the wrap. The head is placed into the body of the wrap, and the stretched elastomeric portion is released. The relaxed elastomeric portion holds the wrap around the head.

18 Claims, 8 Drawing Sheets

(56) References Cited

U.S. PATENT DOCUMENTS

| | | |
|---|---|---|
| 5,698,249 A | 12/1997 | Hayashi et al. |
| 5,743,398 A | 4/1998 | Weder |
| 5,755,320 A | 5/1998 | Weder |
| 5,783,270 A | 7/1998 | Fischer et al. |
| 5,849,127 A | 12/1998 | Kuo |
| 5,921,062 A | 7/1999 | Weder |
| 5,962,092 A | 10/1999 | Kuo et al. |
| 6,022,627 A | 2/2000 | Weder |
| 6,086,967 A | 7/2000 | Whiteman et al. |
| 6,260,729 B1 | 7/2001 | Mitchell et al. |
| 6,294,210 B1 | 9/2001 | Kuo |
| 6,376,032 B1 | 4/2002 | Clarke et al. |
| 6,382,418 B1 | 5/2002 | Weder |
| 6,548,132 B1 | 4/2003 | Clarke et al. |
| 6,880,748 B2 | 4/2005 | Machado et al. |
| 7,169,451 B2 | 1/2007 | Clarke et al. |
| 7,329,452 B2 | 2/2008 | Clarke et al. |
| 7,422,796 B2 | 9/2008 | Chen |
| 7,597,240 B2 | 10/2009 | Machado |
| 7,772,139 B2 | 8/2010 | Chandra |
| 2002/0054969 A1 | 5/2002 | Clarke et al. |
| 2002/0146528 A1 | 10/2002 | Weder |
| 2004/0115318 A1 | 6/2004 | Janssen et al. |
| 2004/0131810 A1 | 7/2004 | Clarke et al. |
| 2004/0188507 A1 | 9/2004 | Machado et al. |
| 2004/0202388 A1* | 10/2004 | Rusnak et al. ............... 383/71 |
| 2005/0123656 A1 | 6/2005 | Machado |
| 2005/0161362 A1 | 7/2005 | Machado |
| 2006/0156755 A1 | 7/2006 | Ouseph et al. |
| 2006/0235116 A1 | 10/2006 | Lazzari et al. |
| 2007/0020466 A1 | 1/2007 | Chen |
| 2007/0078223 A1 | 4/2007 | Chen et al. |
| 2007/0243293 A1 | 10/2007 | Janssen et al. |
| 2008/0020158 A1 | 1/2008 | Chen |
| 2008/0085066 A1 | 4/2008 | Curie et al. |
| 2008/0293847 A1 | 11/2008 | Hekal |
| 2008/0299380 A1 | 12/2008 | Choi et al. |
| 2008/0312057 A1 | 12/2008 | Sakthiakumaran et al. |
| 2009/0179069 A1 | 7/2009 | Schmidt et al. |
| 2009/0239432 A1 | 9/2009 | Chandra |
| 2010/0247725 A1 | 9/2010 | Krijgsman et al. |

FOREIGN PATENT DOCUMENTS

| | | |
|---|---|---|
| EP | 0270764 B1 | 12/1991 |
| EP | 0243965 B1 | 3/1992 |
| EP | 0538713 A1 | 4/1993 |
| EP | 0335682 B1 | 12/1993 |
| EP | 0383575 B1 | 10/1995 |
| EP | 0538713 B1 | 7/1997 |
| EP | 0938516 B1 | 3/2002 |
| EP | 1215229 A2 | 6/2002 |
| EP | 0828783 B1 | 8/2002 |
| EP | 0880437 B1 | 11/2002 |
| EP | 0542853 B1 | 3/2003 |
| EP | 1892262 A1 | 2/2008 |
| EP | 2157025 A1 | 2/2010 |
| EP | 1377448 B1 | 4/2010 |
| WO | 88/06402 A1 | 9/1988 |
| WO | 89/00531 A1 | 1/1989 |
| WO | 91/06426 A1 | 5/1991 |
| WO | 92/02580 A1 | 2/1992 |
| WO | 92/15499 A1 | 9/1992 |
| WO | 94/12040 A1 | 6/1994 |
| WO | 94/25271 A1 | 11/1994 |
| WO | 95/07949 A1 | 3/1995 |
| WO | 95/26269 A1 | 10/1995 |
| WO | 96/38495 A1 | 12/1996 |
| WO | 97/13640 A1 | 4/1997 |
| WO | 97/28964 A1 | 8/1997 |
| WO | 98/01386 A2 | 1/1998 |
| WO | 98/20062 A1 | 5/1998 |
| WO | 98/50230 A1 | 11/1998 |
| WO | 99/25625 A1 | 5/1999 |
| WO | 00/04787 A1 | 2/2000 |
| WO | 00/12306 A2 | 3/2000 |
| WO | 01/36194 A1 | 5/2001 |
| WO | 02/43956 A2 | 6/2002 |
| WO | 02/069723 A2 | 9/2002 |
| WO | 2004/058591 A1 | 7/2004 |
| WO | 2004/086877 A1 | 10/2004 |
| WO | 2004/104081 A2 | 12/2004 |
| WO | 2005/086720 A2 | 9/2005 |
| WO | 2006/055656 A1 | 5/2006 |
| WO | 2007/012016 A2 | 1/2007 |
| WO | 2007/041309 A1 | 4/2007 |
| WO | 2007/058414 A1 | 5/2007 |
| WO | 2007/082347 A1 | 7/2007 |
| WO | 2008/011025 A1 | 1/2008 |
| WO | 2008/045260 A2 | 4/2008 |
| WO | 2009/003675 A1 | 1/2009 |

OTHER PUBLICATIONS az 1099, Guidelines for Head Lettuce Production in Arizona, University of Arizona, Feb. 1999., retrieved Apr. 18, 2013. Retrieved from the Internet: URL: <http://cals.arizona.edu/crops/vegetables/cropmgt/az1099.html>.*

Lettuce, Saltveit, M.E., Department of Vegetable Crops, University of California, Davis, CA, [on line] Feb. 28, 2003, retrieved Apr. 19, 2013. Retrieved from the Ingernet: URL: <http://www.ba.ars.usda.gov/hb66/083lettuce.pdf>.*

Enochian, R.V., Smith, F.J. House Packing Western Lettuce, California Agriculture, Nov. 1956.*

* cited by examiner

COMMERCIAL LETTUCE PACKAGING IN THE FIELD

BACKGROUND

1. Field

The present application relates to commercial production of lettuce in the field and, more particularly, to commercial packaging of lettuce in the field using a wrap that has a body with an opening, and an elastomeric portion around the opening.

2. Related Art

The commercial fresh market lettuce industry is a multi-billion dollar industry. Lettuce is produced and shipped year-round in the U.S. with the source of supplies changing with the seasons, with California and Arizona dominating U.S. production.

Three types of lettuce dominate commercial production: iceberg lettuce, leaf lettuce, and romaine lettuce. Of these three types, iceberg lettuce makes up the majority of the commercial lettuce production in the United States.

Commercial lettuce production involves in-field harvesting and packaging operations. These operations require a team of field workers, referred to as cutters and packers, who work together to commercially harvest and package lettuce in the field. In conventional commercial lettuce production, there is typically one packer for every cutter working as a team in the field.

Commercial lettuce production begins with in-field harvesting. The cutter manually cuts the stems of lettuce using hand-held harvesting knives. The cutter also manually trims the stem of the harvested head, and removes any loose outer leaves as part of the commercial harvesting process. Commercial harvesting is typically a manual process because lettuce heads tend to be somewhat irregular and delicate. After harvesting and trimming the head, the cutter begins the commercial packaging process by placing the harvested head into a bag, and leaving the bagged head on a packaging table for the packer.

The packer continues the commercial production process from where the cutter left off. The packer takes the bagged head from the packaging table by holding the open tail-end of the bag. The packer usually twists the lettuce until the bag is wrapped tightly around the head. The packer then takes the tightly twisted tail-end of the bag, and tapes the tail-end to the bottom of the bagged head with clear tape. Once taped, the packer places the bagged head into cardboard boxes, which are more commonly referred to as cartons. The cartons of bagged whole heads are then closed and placed on pallets. The palletized cartons are then transported to a cooling facility where they are vacuum-cooled and placed into a cold room. At the conclusion of the commercial packaging process, the pallets are shipped to destination markets, where they are ultimately shipped to end users.

The amount of time a packer spends for each head is typically longer than the amount of time a cutter spends. The cutter and packer work at different rates because the packer's movements of twisting and taping generally require more time than the cutter's movements of cutting and trimming. Since there is typically one packer for each cutter in every team of field workers, the cutter's productivity is thus slowed down by the packer's inefficiencies. In addition to the costs associated with decreased productivity among teams of field workers, there is also the cost associated with the tape and tape dispensers. Additionally, the wrap is also not re-usable for the end user, who usually has to cut off the twisted and taped end with scissors or a knife to open the packaged lettuce head.

SUMMARY

In one exemplary embodiment, lettuce can be commercially packaged in the field using a wrap that has a body with an opening, and an elastomeric portion around the opening. The elastomeric portion of the wrap is stretched wide enough to place the head into the wrap. Once the head is placed into the body of the wrap, the stretched elastomeric portion is released, and the relaxed elastomeric portion holds the wrap around the head.

BRIEF DESCRIPTION OF THE DRAWINGS

The present application can be best understood by reference to the following description taken in conjunction with the accompanying drawing figures, in which like parts may be referred to by like numerals.

DETAILED DESCRIPTION

The following description sets forth numerous specific configurations, parameters, and the like. It should be recognized, however, that such description is not intended as a limitation on the scope of the present invention, but is instead provided as a description of exemplary embodiments.

The following description relates primarily to the commercial production of iceberg lettuce, which is also commonly referred to as crisphead or head lettuce. As mentioned above, the market for iceberg lettuce accounts for the majority of the lettuce market in the United States. It should be recognized, however, that the following description is also relevant to the commercial production of various types of lettuce, as well as various types of produce, such as cauliflower, broccoli, and cabbage.

As described above, commercial production of iceberg lettuce involves teams of field workers to commercially harvest and package the lettuce in the field. There is usually one packer for every cutter in each team.

Figure 1:
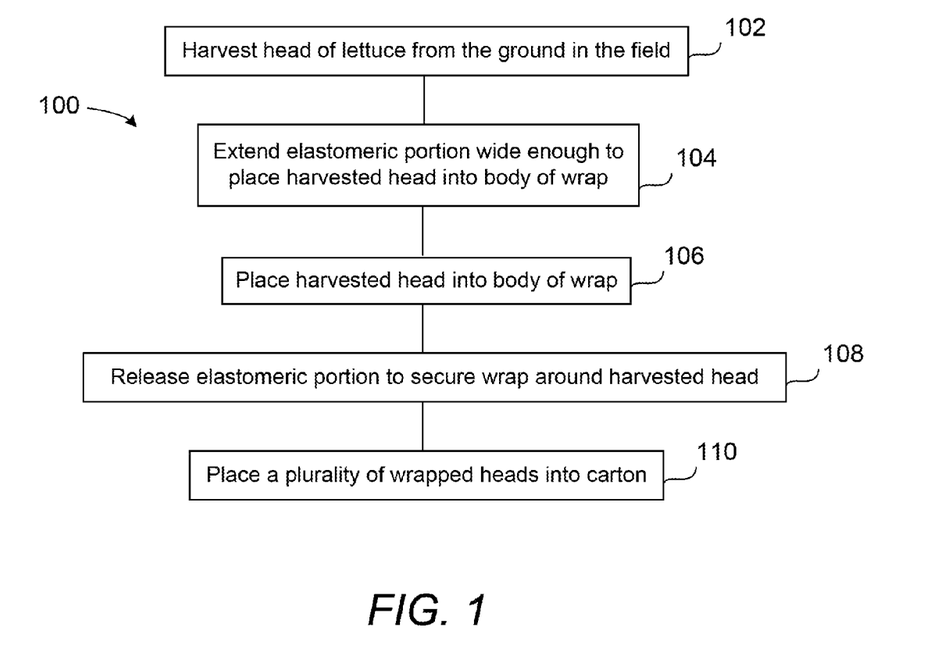
FIG. 1 depicts an exemplary process of commercially harvesting and packaging lettuce in the field.

In one exemplary embodiment, with reference to FIG. 1, an exemplary process 100 of commercially harvesting and packaging lettuce in the field is depicted. In step 102, the cutter begins the commercial production process by harvesting the lettuce.

Figure 2:
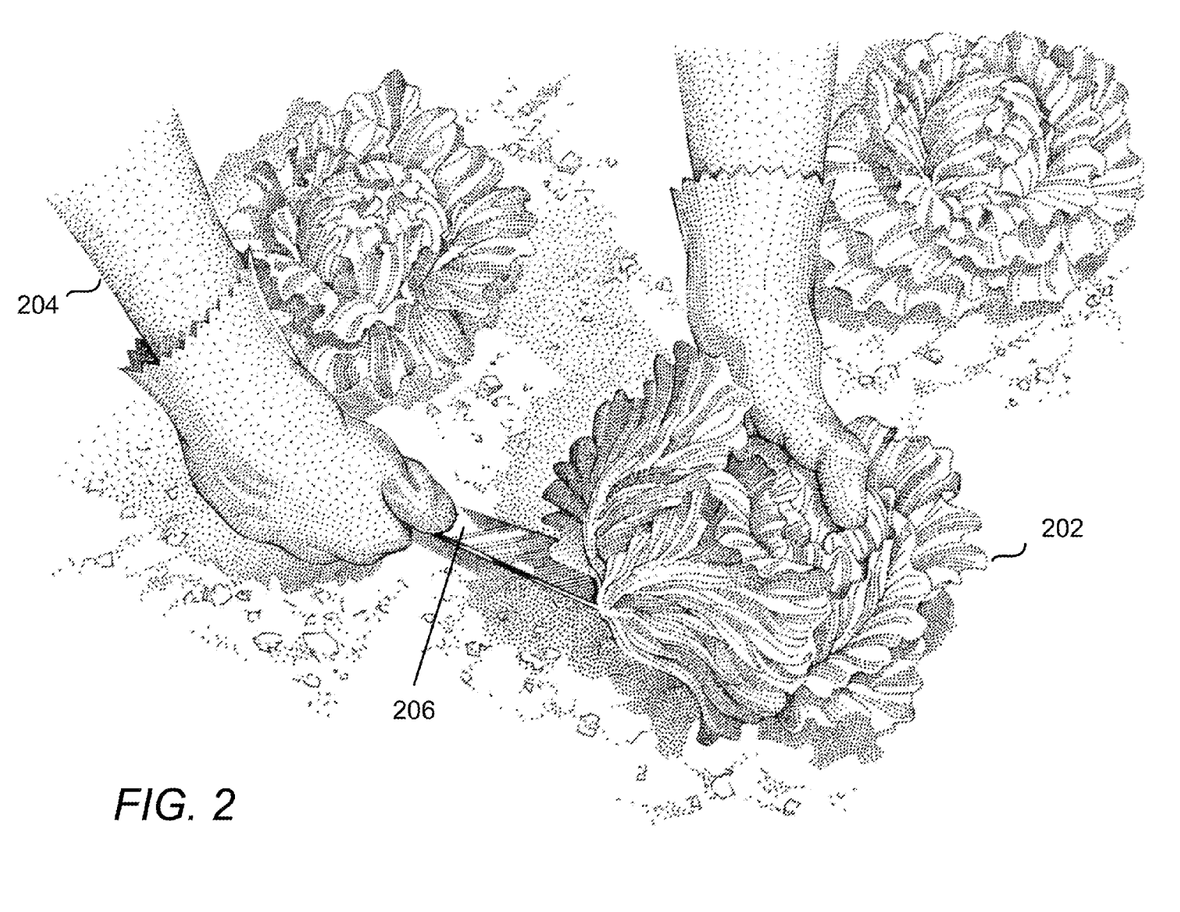
FIG. 2 depicts a cutter harvesting a head of lettuce from the ground by cutting the stem of the lettuce.
Figure 3:
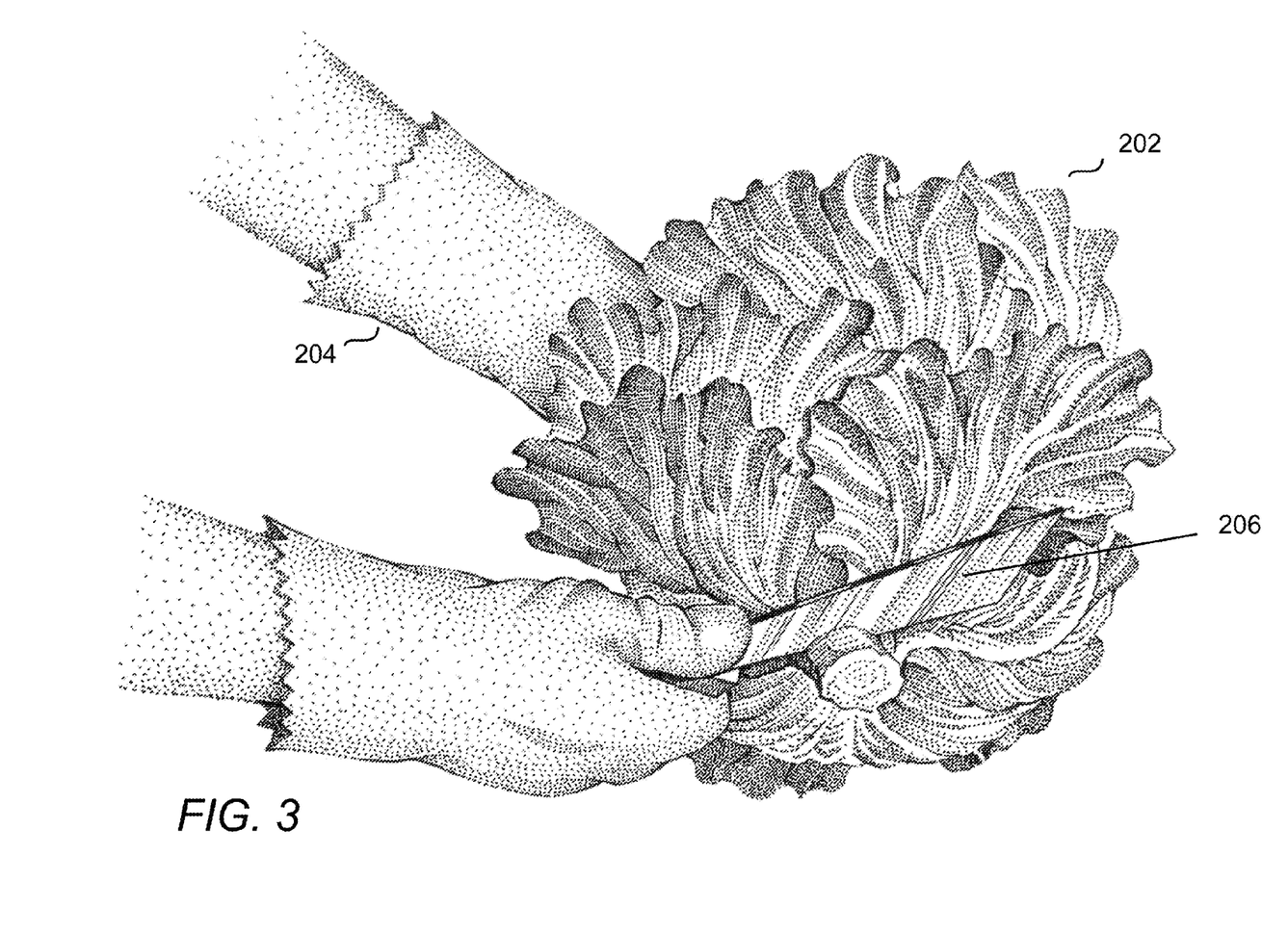
FIG. 3 depicts a cutter trimming the stem of the harvested head.

As depicted in FIG. 2, cutter 204 uses harvesting knife 206 to cut the stem of the lettuce head 202 to remove the harvested lettuce head 202 from the ground. Cutter 204 then removes some of the outer leaves, which are left on the ground. As depicted in FIG. 3, cutter 204 also trims the stem with harvesting knife 206. A remnant amount of the stem remains with harvested lettuce head 202.

Figure 4A:
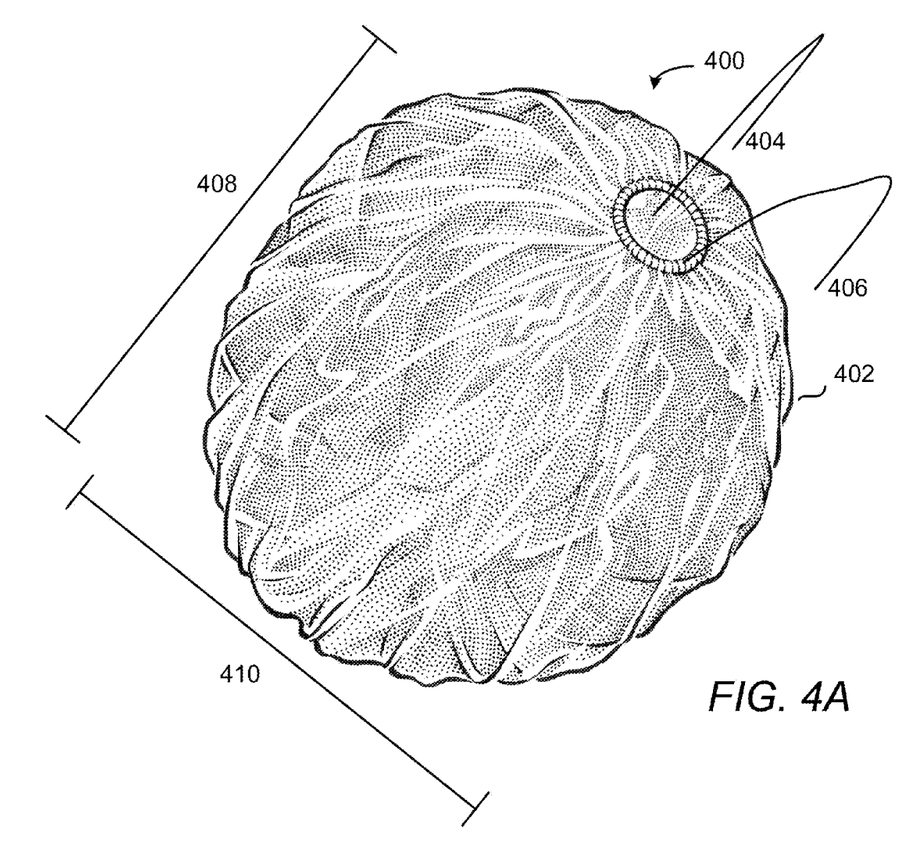
FIG. 4A depicts a wrap in which the elastomeric portion is in a relaxed state.
Figure 4B:
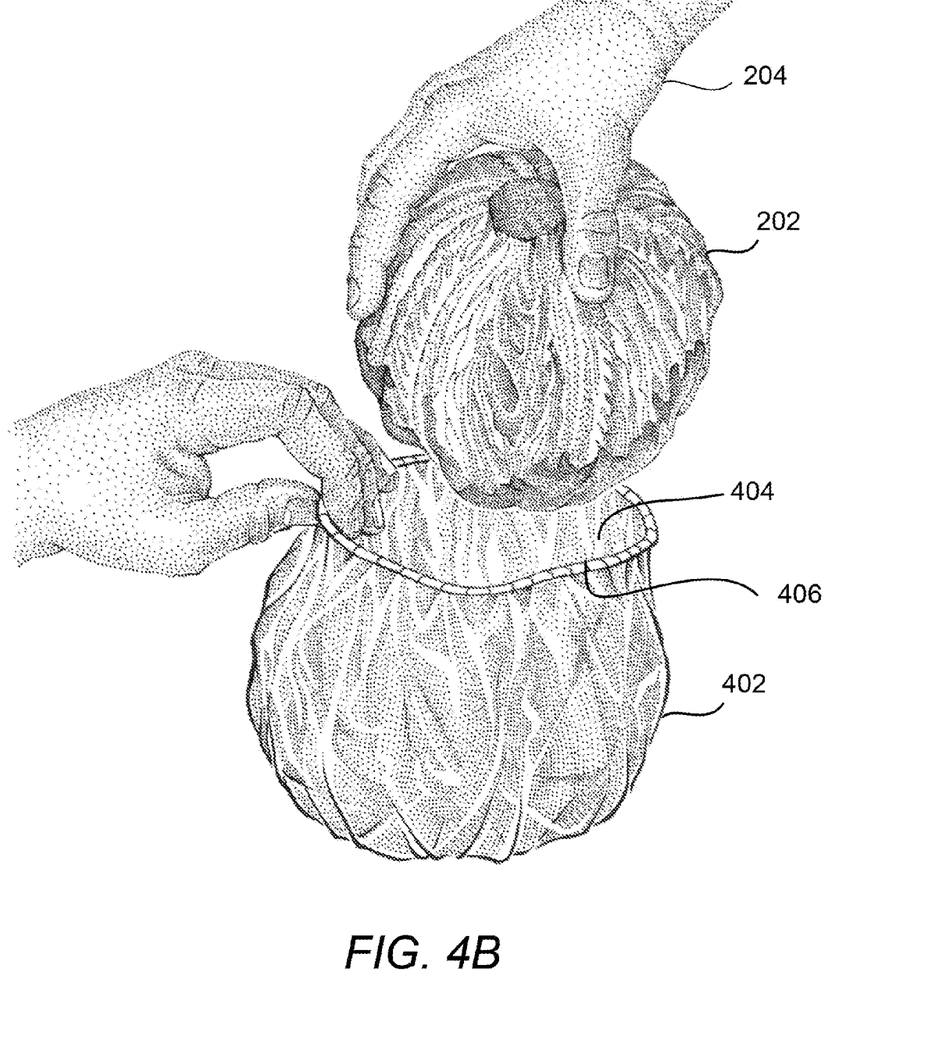
FIG. 4B depicts a wrap in which the elastomeric portion is in a stretched state.

With reference again to FIG. 1, in step 104, the cutter stretches an elastomeric portion of a wrap wide enough to place the harvested head into the body of the wrap. In particular, as depicted in FIG. 4A, wrap 400 has a body 402 with opening 404, and elastomeric portion 406 around opening 404. With reference to FIG. 4B, with harvested lettuce head 202 in one hand, cutter 204 reaches for wrap 400 with his other hand. Wrap 400 typically hangs in a stack attached to one or more wickets on the cutter's belt. While wrap 400 is attached to the one or more wickets on the cutter's belt, cutter 204 stretches elastomeric portion 406 wide enough to place harvested head 202 into body 402.

With reference again to FIG. 1, in step 106, the cutter places harvested lettuce head 202 (FIG. 4B) into wrap 400 (FIG. 4B). In step 108, the cutter then releases elastomeric portion 406 (FIG. 4B). The cutter detaches wrap 400 (FIG. 4B), with harvested lettuce head 202 (FIG. 4B) inside, from the one or more wickets on the cutter's belt.

Figure 5:
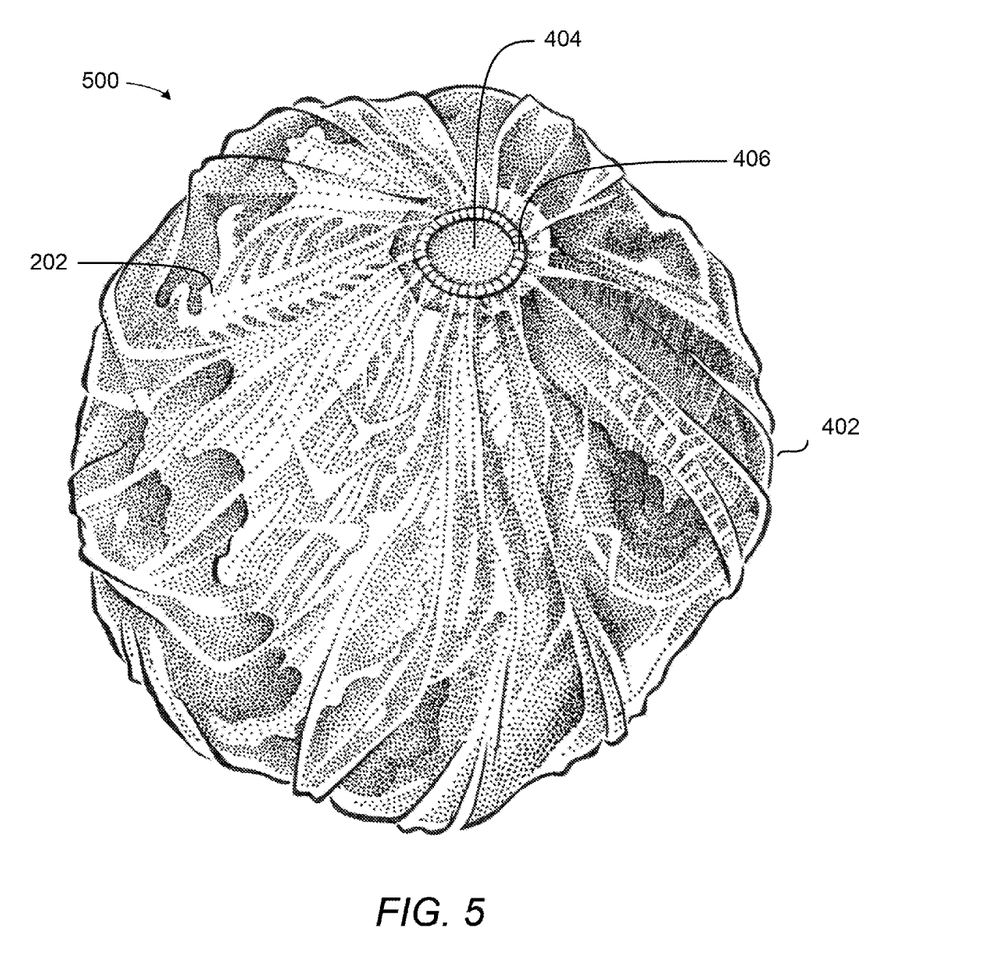
FIG. 5 depicts a wrapped head in which the elastomeric portion in its relaxed state secures the wrap around the harvested head.
Figure 6A:
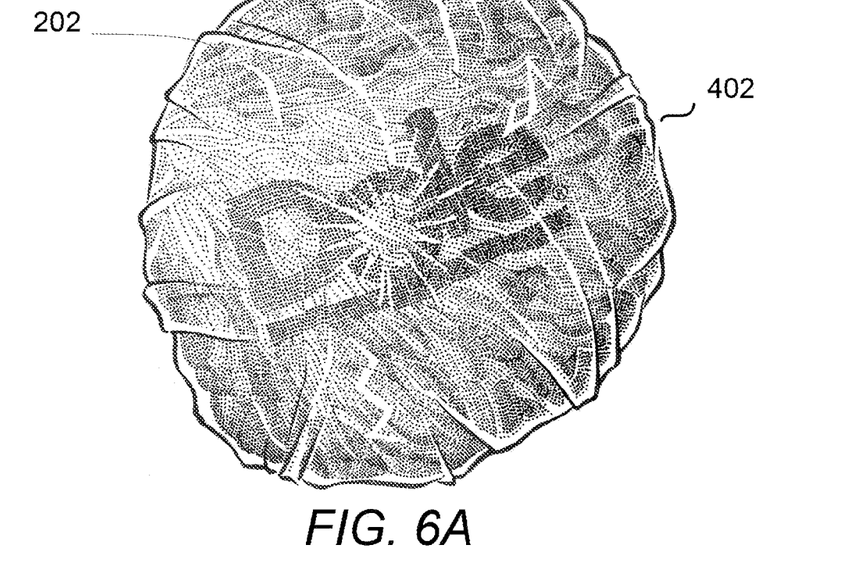
FIG. 6A depicts the body side of the wrapped head.
Figure 6B:
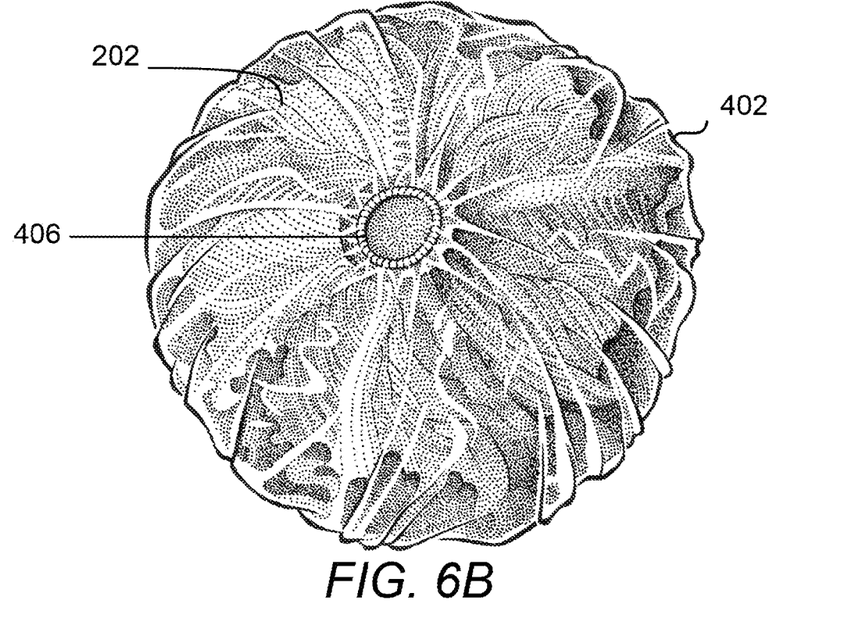
FIG. 6B depicts the opening side of the wrapped head.

With reference to FIG. 5, when elastomeric portion 406 is relaxed, opening 404 prevents wrap 400 from forming a sealed package around harvested lettuce head 202. As depicted in FIG. 6A and FIG. 6B, when elastomeric portion 406 is relaxed, body 402 is secured around harvested lettuce head 202.

It should be recognized that body 402 can be disposed tightly around or flush against harvested lettuce head 202. Alternatively, body 402 may be disposed loosely around harvested lettuce head 202. Body 402 can have any dimension that completely covers harvested lettuce head 202.

Figure 7:
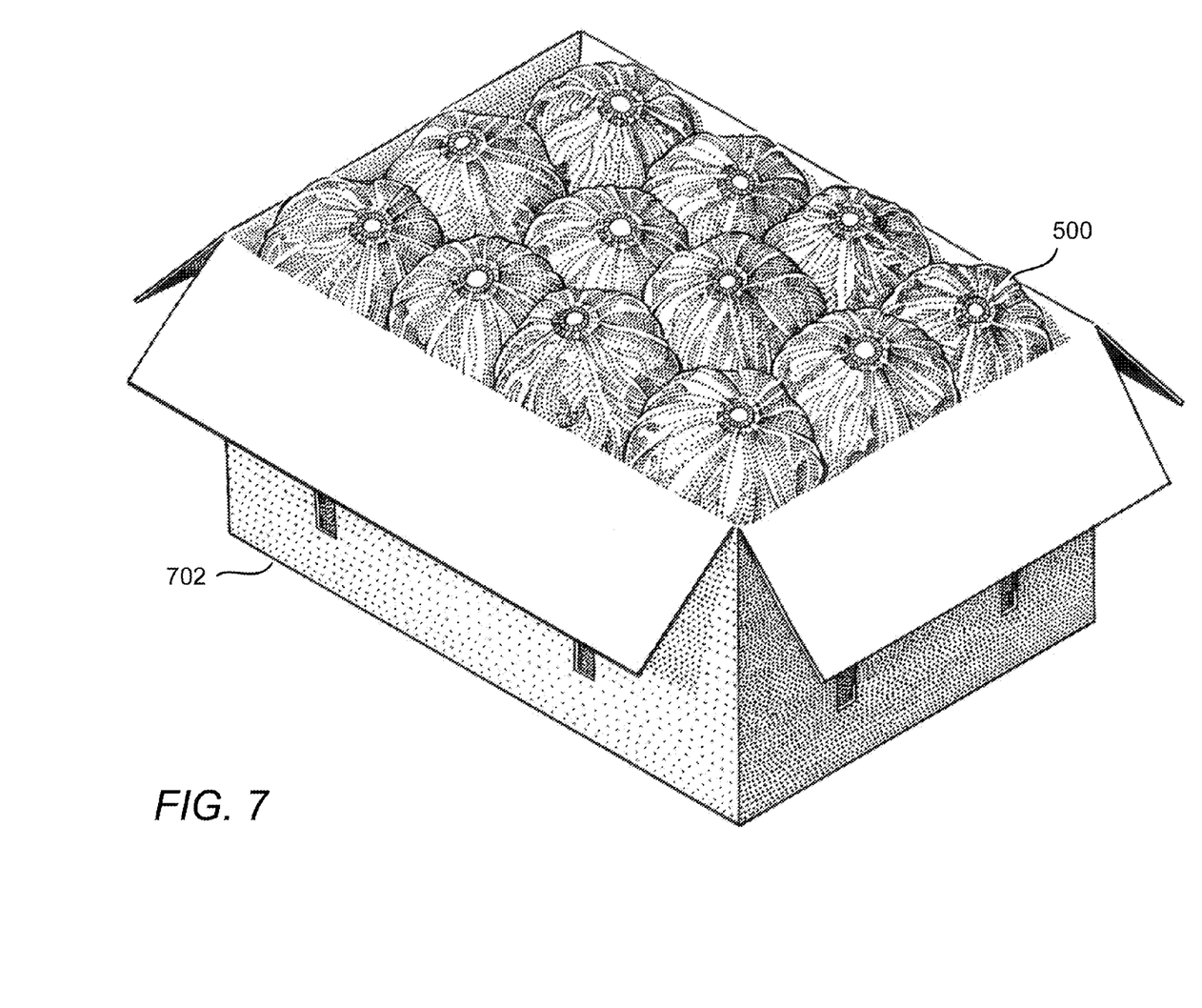
FIG. 7 depicts wrapped heads packed into a carton.

With reference again to FIG. 1, in step 110, the cutter then places the wrapped lettuce heads into a cardboard box, which is more commonly referred to as a carton. FIG. 7 depicts wrapped lettuce heads 500 in carton 702. Multiple cartons 702 are stacked on a single pallet. Cartons 702 on the pallet are typically vacuum-cooled, and then shipped to destination markets, where they are ultimately shipped to end users.

While the cutter in process 100 places the wrapped lettuce heads into a cardboard box, in other exemplary embodiments, the cutter may place the wrapped lettuce heads onto a moving conveyor belt of a field-harvesting machine. The conveyor belt transports the wrapped lettuce heads to a packer, who continuously receives and places these wrapped lettuce heads into cartons. The packer may place wrapped lettuce heads prepared by multiple cutters into cartons.

With reference again to FIG. 4A, wrap 400 has a length (as depicted by element 408) of about 7 inches, and a width (as depicted by element 410) of about 8 inches. Body 402 is made of a low-density polyethylene material, and has perforations with a diameter of about 2 mm. Furthermore, in this exemplary embodiment, elastomeric portion 406 is made of rubber. When elastomeric portion 406 is in its relaxed state, opening 404 has a diameter of about 1 inch. When elastomeric portion 406 is in its stretched state, opening 404 has a maximum diameter of about 15.5 inches.

It should be recognized, however, that wrap 400 can be of any dimension. In some embodiments, length 408 may be anywhere from about 5 to 11 inches, and width 410 may be anywhere from about 5 to 15.5 inches. In other exemplary embodiments, length 408 may be 5, 5.5, 6, 6.5, 7, 7.5, 8, 8.5, 9, 9.5, 10, 10.5, or 11 inches, and width 410 may be 5, 5.5, 6, 6.5, 7, 7.5, 8, 8.5, 9, 9.5, 10, 10.5, 11, 11.5, 12, 12.5, 13, 13.5, 14, 14.5, 15, or 15.5 inches.

Furthermore, body 402 can be constructed of any material known in the art that is used for food packaging. Body 402 can be formed from a plastic material. Exemplary plastic materials include, but are not limited to, low-density polyethylene, linear low-density polyethylene, high-density polyethylene, polypropylene, butadiene, polystyrene, polyester, or any combination of these materials.

The one or more perforations on body 402 can also be of any size and shape. For example, perforations having a diameter greater than or equal to about 0.05 mm and less than or equal to about 0.5 inch. The perforations can be visible to the naked eye or only under microscopic viewing.

It should also be recognized that elastomeric portion 406 can be constructed of any material known in the art that is an elastomer. Exemplary elastomers include, but are not limited to, natural polyisoprene, synthetic polyisoprene, polybutadiene, and various forms of rubbers.

Elastomeric portion 406 in its relaxed, unstretched state may result in opening 404 having a diameter greater than or equal to about 1/8 inch and less than or equal to about 4 inches. Elastomeric portion 406 can be stretched to increase the diameter of opening 404 wide enough to place a harvested lettuce head into body 402. For example, when elastomeric portion 406 is stretched, opening 404 can have a maximum diameter of about 15.5 inches. In some embodiments, the opening may have a diameter between about 5 inches to about 15.5 inches.

As discussed above, wrap 400 typically hangs as a stack of wraps welded or heat-welded together, which is typically connected to the cutter's belt by wickets or hooks. Wrap 400 can have one or more holes welded to a wicket. In some embodiments, wrap 400 may have two wicket holes located anywhere from about 0.5 to 12 inches apart. In other embodiments, wrap 400 may have two wicket holes located about 0.5, 1, 2, 3, 4, 5, 6, 7, 8, 9, 10, 11, or 12 inches apart. The wicket hole may be of any size. For example, wicket holes of 1, 0.75, 0.5, or 0.25 inch can be used.

The one or more wicket holes may be located on anywhere on body 402. For example, the one or more wicket holes may be located on body 402 near opening 404. As discussed above, wrap 400 attached to one or more wickets allows the cutter to easily stretch, with one hand, elastomeric portion 406 wide enough to place harvested lettuce head 202 into body 402.

The foregoing descriptions of specific embodiments have been presented for purposes of illustration and description. They are not intended to be exhaustive, and it should be understood that many modifications and variations are possible in light of the above teaching.

We claim:

1. A method of commercially packaging lettuce in a field using a wrap, the lettuce having a head, a stem, and roots, wherein the stem connects the head to the roots when the lettuce is growing in the ground, the wrap having a body with an opening and an elastomeric portion, wherein the elastomeric portion is attached near the opening of the wrap, wherein the wrap has a portion that is attached to a belt worn by a cutter, and wherein the wrap hangs as a stack of wraps from the belt worn by the cutter, the method comprising:
   a) cutting the lettuce at the stem to harvest the head from the ground;
   b) extending the elastomeric portion of the wrap to form a stretched portion;
   c) placing the head through the stretched portion of the wrap into the body of the wrap;
   d) releasing the stretched portion of the wrap, wherein the wrapped head remains attached to the belt worn by the cutter;

e) detaching the wrapped head from the belt worn by the cutter; and f) placing the detached wrapped head in a carton, wherein steps a)-f) are performed in the field in which the head was harvested.

2. The method of claim 1, wherein the body is dimensioned to completely cover the head.

3. The method of claim 1, wherein the body comprises a material selected from the group consisting of low-density polyethylene, linear low-density polyethylene, high-density polyethylene, polypropylene, butadiene, polystyrene, polyester, and any combinations thereof.

4. The method of claim 1, wherein the body has one or more perforations.

5. The method of claim 4, wherein each perforation has a diameter greater than or equal to about 0.002 mm and less than or equal to about 0.5 inch.

6. The method of claim 1, wherein the elastomeric portion comprises a material selected from the group consisting of polyisoprene, polybutadiene, and rubber.

7. The method of claim 1, wherein the opening when the elastomeric portion is in its relaxed state has a diameter greater than or equal to about ⅛ inch and less than or equal to about 4 inches.

8. The method of claim 1, wherein the opening when the elastomeric portion is in its stretched state has a maximum diameter of about 15.5 inches.

9. The method of claim 1, wherein the lettuce is an iceberg lettuce.

10. The method of claim 1, further comprising:

stacking a plurality of cartons on a pallet;

vacuum-cooling the cartons on the pallet; and shipping the pallet with the stacks of cartons to destination markets.

11. A method of commercially packaging lettuce in a field using a wrap, the lettuce having a head, a stem, and roots, wherein the stem connects the head to the roots when the lettuce is growing in the ground, wherein the wrap has a body and an opening, wherein at least a portion of the opening is elastomeric, wherein at least a portion of the wrap is attached to a belt worn by a cutter, the method comprising:

a) cutting the lettuce at the stem to harvest the head from the ground;

b) placing the head through a stretched elastomeric opening of the wrap into the body of the wrap;

c) releasing the stretched elastomeric opening of the wrap to form a wrapped head, wherein the wrapped head remains attached to the belt worn by the cutter; and d) detaching the wrapped head from the belt worn by the cutter, wherein steps a)-d) are performed in the field in which the head was harvested.

12. The method of claim 11, wherein the body is dimensioned to completely cover the head.

13. The method of claim 11, wherein the body comprises a material selected from the group consisting of low-density polyethylene, linear low-density polyethylene, high-density polyethylene, polypropylene, butadiene, polystyrene, polyester, and any combinations thereof.

14. The method of claim 11, wherein the body has one or more perforations.

15. The method of claim 11, wherein the elastomeric portion of the opening comprises a material selected from the group consisting of polyisoprene, polybutadiene, and rubber.

16. The method of claim 11, wherein the elastomeric portion of the opening in its relaxed state has a diameter greater than or equal to about ⅛ inch and less than or equal to about 4 inches.

17. The method of claim 11, wherein the elastomeric portion of the opening in its stretched state has a maximum diameter of about 15.5 inches.

18. The method of claim 11, wherein the lettuce is an iceberg lettuce.

\* \* \* \* \*